Jan. 24, 1967 A. T. TROSTRUD, JR 3,300,765

DIGITAL COMPUTER SYSTEM

Original Filed Sept. 5, 1962 3 Sheets-Sheet 1

*INVENTOR.*
ARVILLE T. TROSTRUD JR
BY [signature]
ATTORNEY

DIGITAL COMPUTER SYSTEM
Original Filed Sept. 5, 1962 3 Sheets-Sheet 2
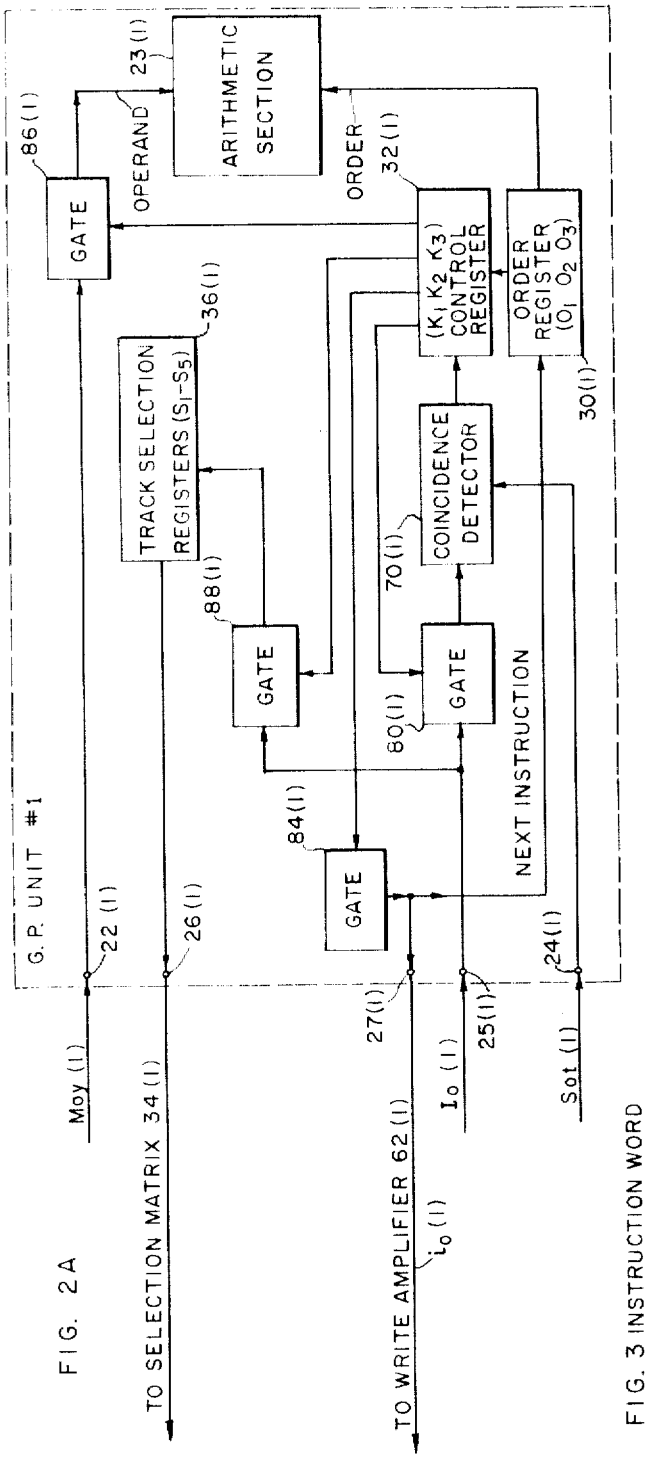
FIG. 2A
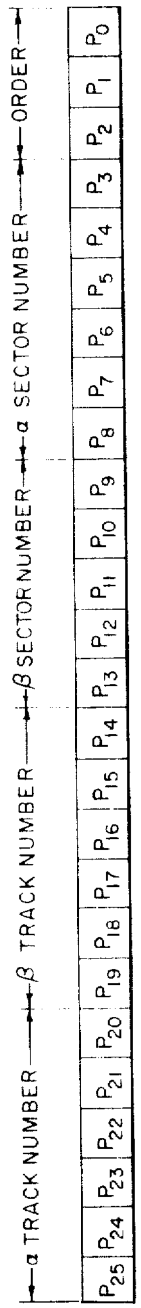
FIG. 3 INSTRUCTION WORD
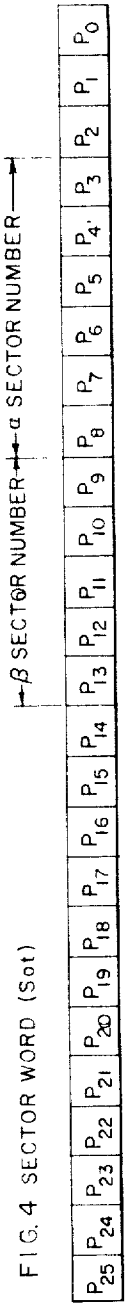
FIG. 4 SECTOR WORD (Sot)

3,300,765
DIGITAL COMPUTER SYSTEM

Arville T. Trostrud, Jr., Butler, N.J., assignor to General Precision Inc., Little Falls, N.J., a corporation of Delaware

Continuation of application Ser. No. 221,544, Sept. 5, 1962. This application June 9, 1966, Ser. No. 562,047
3 Claims. (Cl. 340—172.5)

The present invention relates to digital computers, and it relates more particularly to an improved type of digital computer system which exhibits a high degree of reliability and adaptability.

This application is a continuation of copending application, Serial No. 221,544, filed September 5, 1962.

Copending application Serial No. 512,466, filed December 8, 1965, in the name of Robert E. Bible et al., and assigned to the same assignee as the present invention, discloses and claims a computer system which includes a plurality of general purpose and incremental computer units, all operating from a single memory.

The system described and claimed in the copending application enables high speed computations to be made with relatively simple circuits. It also provides for redundancy reliability in that performance, although degraded, can continue in the presence of a malfunction in less than all of the arithmetic units.

As pointed out in the copending application, the digital computer in recent years has replaced the analog computer to a large extent in many fields; this being due to the increased reliability and adaptability of the digital computer as compared with the analog computer. However, as also pointed out in the copending application, the prior art digital computer still does not exhibit sufficient reliability for use in many areas.

Accordingly, the computer system disclosed and claimed in the copending application is one which is capable of high computational speeds with relatively simple circuitry and equipment, and one which exhibits redundancy characteristics for a high degree of reliability.

It is evident that the reliability of the computer system disclosed and claimed in the copending application can be achieved with the desired high degree only if the system is so devised that a malfunction in one, or more, of the computer units is not reflected into any of the other computer units of the system. That is, each of the computer units in the system must be fully isolated from all the others. Although isolating circuitry may be used to achieve this end, such circuitry itself must achieve a high degree of reliability or it also may contribute to an overall malfunction in the system.

An object of the present invention is to provide a simple system of the general type disclosed in the copending application, which does not require isolation circuitry, and by which complete isolation is assured between the various computer units in the system.

In carrying out the concepts of the present invention, all the information transfers in the computer system, which are required to enable the system to achieve an improvement in solution rate and in reliability, are made through the memory medium itself, and not through any electrical coupling between the individual computer units.

The features of the invention which are believed to be new are set forth in the claims. Further objects and advantages of the invention, however, will become evident from a consideration of the following description, when the description is taken in conjunction with the accompanying drawings, in which:

FIGURES 2A and 2B are block diagrams of two general purpose computer units for use in the computer system of the invention; and FIGURES 3 and 4 are diagrammatic representations of instruction and sector words, respectively, utilized in the computer to be described.

Figure 1:
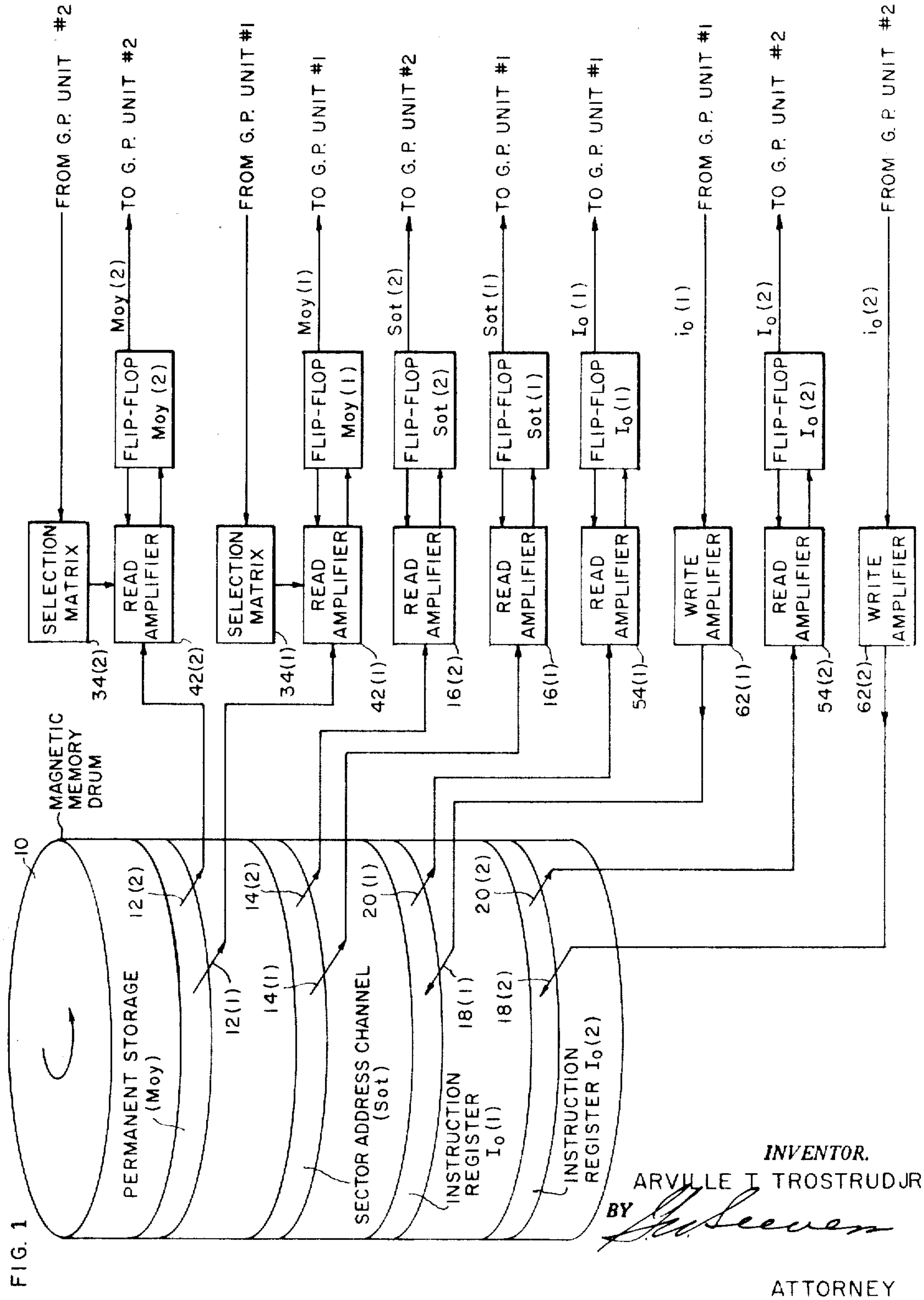
FIGURE 1 is a block diagram of a magnetic memory drum and associated components, suitable for use in the computer system of the invention.

The system of FIGURE 1 includes a magnetic memory drum 10. This drum may be of any usual construction, and it may be considered to the rotating in a counterclockwise direction as viewed from the top. The magnetic memory drum 10 includes a plurality of imaginary tracks or channels which extend around the periphery of the drum and which are positioned adjacent one another.

Binary information representing different data for use by the computer system is stored in the various channels, and in different sectors in each channel. Each channel may, for example, include 64 different sectors, and each sectors may store a multibit binary word representative of a particular piece of information. In the embodiment of the invention to be described, each multibit binary word is considered to include 25 binary bits. These bits occur at successive bit times designated P0–P24.

A plurality of adjacent multi-sector channels on the magnetic memory drum 10 are used as a permanent storage for the instructions and operands to be used in the computer system program. A plurality of different multibit binary words representing the computer instructions and operands are stored in the adjacent channels in the permanent storage, these being designated $M_{oy}$.

A first plurality of electromagnetic transducer read heads are represented schematically by the arrow 12(1), and these read heads respectively scan the adjacent multisector channels in the permanent storage ($M_{oy}$) section of the drum. These heads are connected to a read amplifier designated 42(1), and a selection matrix designated 34(1) controls the selection of the individual heads 12 to permit information from the channels scanned by a selected head to be passed by the read amplifier 42(1) to a flip-flop designated $M_{oy}$(1).

In accordance with the concepts of the present invention, a second plurality of electromagnetic transducer read heads, designated by the arrow 12(2), are respectively spaced along the respective channels of the permanent storage section by an integral number of selectors from the corresponding ones of the group 12(1).

The latter group of read heads 12(2) is coupled to a read amplifier 42(2), the selection of the individual heads being controlled by a selection matrix 34(2). The selection matrix determines which read head of the group 12(2) will be effectively connected to the read amplifier 42(2) so that the information from its corresponding channel may be passed to a flip-flop $M_{oy}$(2) which is coupled to the read amplifier.

As mentioned above, each channel in the permanent storage section ($M_{oy}$) of the magnetic memory drum 10 is composed of a plurality of sectors. Each sector has a different address, and the addresses of the successive sectors are contained in a sector address channel ($S_{ot}$) on the memory drum 10. A first read head designated by the arrow 14(1) is coupled to the $S_{ot}$ channel, and that read head is connected to a read amplifier 16(1) which in turn is coupled to a flip-flop $S_{ot}$(1).

A second read head designated by the arrow 14(2) is also coupled to the sector address channel ($S_{ot}$), and the head 14(2) is displaced from the head 14(1) by an amount corresponding to the displacement between the group of heads 12(1) and 12(2). The latter read head 14(2) is connected to a read amplifier 16(2) which, in turn, is coupled to a flip-flop $S_{ot}$(2).

The drum 10 also includes an instruction register channel $I_o$(1), and it includes a second instruction register channel $I_o$(2).

The selection matrix 34(1) and the selection matrix 34(2) are under the control of the instruction words respectively contained in the instruction register channels $I_o$(1) and $I_o$(2).

These instruction words, as shown in FIGURE 3, each include an $\alpha$ track number at the (P25–P20) bit positions. This number controls the corresponding selection matrix 34(1) or 34(2) to select the proper track for the next instruction.

Each of the instruction words in the register channels $I_o$(1) and $I_o$(2), as also shown in FIGURE 3, further includes a $\beta$ track number in the (P19–P14) bit positions. This latter number controls the corresponding selection matrix 34(1) or 34(2) to select the proper track for the operand to be selected from the memory section ($M_{oy}$).

The sector location of the next instruction is contained as an "$\alpha$ sector number" at the (P8–P3) bit positions of the instruction word of FIGURE 3. This number is compared with the sector numbers of successive sector words (FIGURE 4) read from the $S_{ot}$ channel. This comparison proceeds until identity is achieved to indicate that the proper sector has been reached.

Likewise, the sector location of the operand is contained as a "$\beta$ sector number" at the (P13–P9) bit positions of the instruction word of FIGURE 3. This latter number is compared with the $\beta$ sector numbers of successive sector words (FIGURE 4) read from the $S_{ot}$ channel. This latter comparison proceeds until identity is achieved which indicates that the sector on the drum of the desired operand has been reached.

It will be appreciated that other information and register channels may also be included on the memory drum 10. However, these channels form no part of the invention and do not affect the explanation of the present invention. Therefore, in order to simplify the description of the invention, these latter channels have been omitted.

The instruction register $I_o$(1) has a write head designated by the arrow 18(1) coupled to it, and it has a read head designated by the arrow 20(1) also coupled to it; the read head 20(1) being displaced a predetermined number of binary bit positions from the write head 18(1). The read head 20(1) is coupled to a read amplifier 54(1) which, in turn, is coupled to a flip-flop $I_o$(1). A write amplifier 62(1) is coupled to the write head 18(1).

The instruction register channel $I_o$(2) has a write head coupled to it, the write head being designated 18(2). A read head 20(2) is also coupled to the instruction register channel $I_o$(2). The heads 18(2) and 20(2) are displaced from one another a distance corresponding to the displacement of the heads 18(1) and 20(1).

The read head 20(2) is coupled to a read amplifier 54(2) which, in turn, is coupled to a flip-flop designated $I_o$(2). A write amplifier 62(2) is connected to the write head 18(2).

Figure 2B:
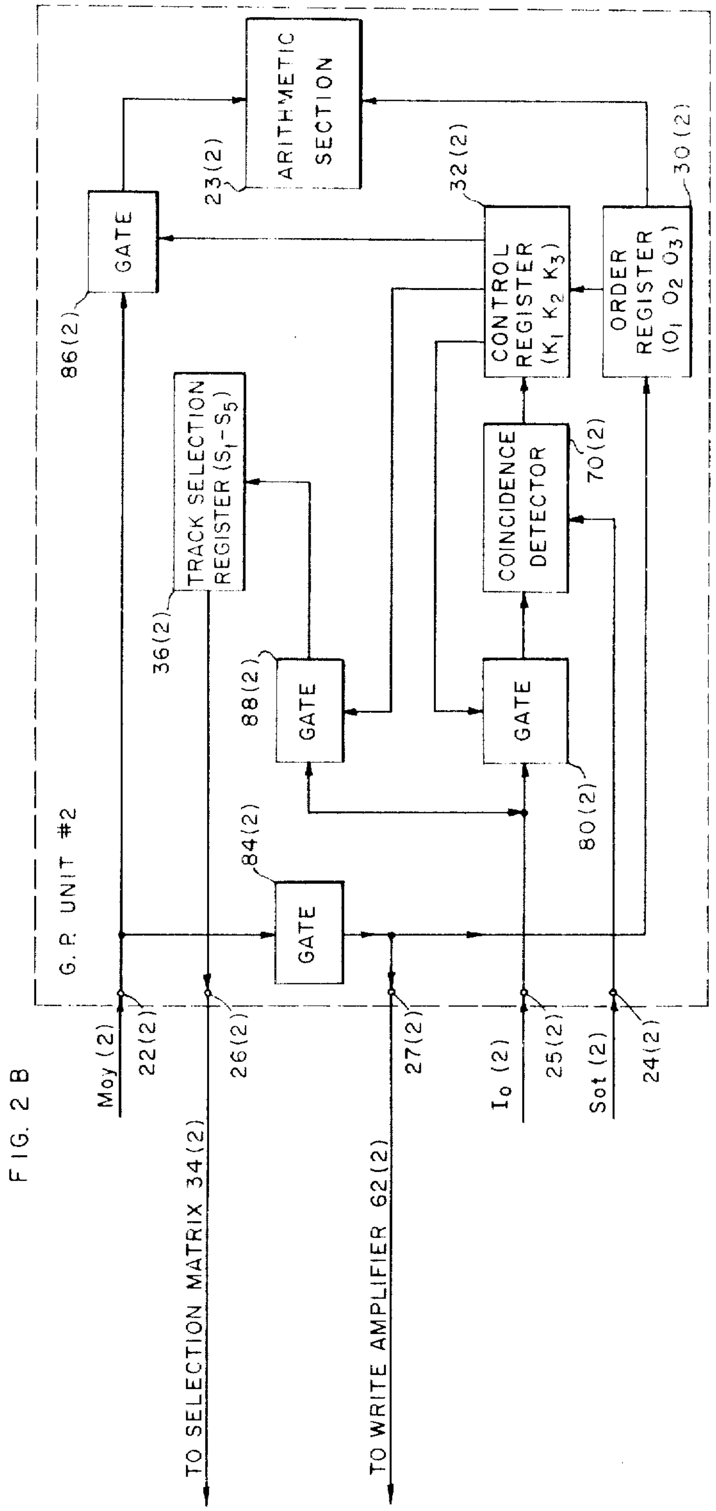

As indicated in FIGURE 1, the flip-flop $M_{oy}$(2) supplies $M_{oy}$(2) signals to a general purpose computer unit #2 in FIGURE 2B, and the flip-flop $M_{oy}$(1) supplies $M_{oy}$(1) signals to a general purpose computer unit #1 in FIGURE 2A. The system of the present invention, for purposes of explanation, is considered to include two separate general purpose computer units. The use of these two computer units, as mentioned above, and as more fully explained in the copending application Serial No. 512,466 increases the reliability of the computer system because of the redundancy characteristics of the overall system. It will be appreciated that additional general purpose computer units may be included in the system.

As also indicated in FIGURE 1, the flip-flop $S_{ot}$(2) supplied $S_{ot}$(2) signals to the general purpose computer unit #2, and the $S_{ot}$(1) flip-flop supplied $S_{ot}$(1) signals to the general purpose computer #1.

Instruction signals $i_o$(1) from the general purpose computer unit #1 are received by the write amplifier 62(1), to be written into the instruction register channel $I_o$(1), and these signals are subsequently read out of the channel and returned to the general purpose computer unit #1 through the flip-flop $I_o$(1).

Likewise, instruction signals $i_o$(2) received from the general purpose computer unit #2 are circulated through the instruction register channel $I_o$(2) and returned to the general purpose computer unit #2 through the flip-flop $I_o$(2).

The selection matrix 34(1) is controlled by the general purpose computer unit #1, as will be described in conjunction with FIGURE 2; in like manner the selection matrix 34(2) is controlled by the general purpose computer unit #2, in a manner also to be described.

The general purpose computer units #1 and #2 are shown in the block diagrams of FIGURES 2A and 2B. The general purpose computer unit #1 includes an input terminal 22 which receives the $M_{oy}$(1) signals. This terminal is connected to a gate 86(1) which, in turn, is coupled to an arithmetic section 23. The arithmetic section 23 may include the usual computer components, and this section is described in more detail in copending application 512,466 referred to above.

The general purpose computer unit #1 also includes an input terminal 24(1) which receives the $S_{ct}$(1) signals. This terminal is connected to a coincidence detector 70(1). The unit #1 also includes an input terminal 25(1) which receives the $I_o$(1) signals. This terminal is connected to a gate 80(1) and to a gate 88(1).

The gate 80(1) is connected to the coincidence detector 70(1), and the gate 88(1) is connected to a track selection register 36(1). The track selector register may include a plurality of flip-flops designated S1–S5 as more fully explained in the copending case. The track selector register is coupled through an output terminal 26(1) to the track selection matrix 34(1).

The general purpose computer #1 includes an order register 30(1) which may include a plurality of flip-flop 01, 02 and 03, as more fully explained in the copending application. The order register 30(1) is coupled to a control register 32(1); the control register may include a plurality of flip-flop K1, K2 and K3, as is also more fully explained in the copending case.

The order register 30(1) is also connected to the arithmetic section 23(1). The control register 32(1) is connected to the gate 80(1), to the gate 88(1), and to the gate 86(1).

The control register 32(1) is also connected to a gate 84(1). The gate 84(1) is interposed between the input terminal 22(1) and an output terminal 27(1). The output terminal 27(1) is connected to the write amplifier 62(1) of FIGURE 1. The gate 84(1) is also connected to the order register 30(1).

The circuitry of the general purpose computer unit #2 is generally similar to that of the general purpose computer unit #1, described above. The components of the general purpose computer unit #2 are indicated in the same manner as corresponding components in the unit #1, with the exception that each numeral is followed by (2) rather than (1).

The operation of the general purpose computer unit #1 will now be described, and it will be understood that the internal functioning of the unit #2 is similar to that of unit #1. Reference is also made to the above-mentioned copending application for a more detailed explanation of the operation of these units insofar as their internal circuitry is concerned.

Each of the general purpose computer units is capable of undergoing A seven different phases under the control of the control flip-flops K1, K2 and K3 in the control register 32(1) or in the control register 32(2). The control registers are, in turn, respectively controlled by the corresponding order registers 30(1) and 30(2). The different phases are as follows:

The "wait alpha" phase ($W_A$) during which a search is made for the next instruction, and for which the control flip-flops are set, for example, to the $\overline{K1}$, K2, $\overline{K3}$ configuration. When these flip-flops are in this configuration, the gate 88(1) is opened from P13 *to* P19 bit times. This enables the flip-flops S1–S5 of the track selection register 36(1) to be set to a configuration corresponding to the track number specified by the instruction circulating in the instruction register $I_0$(1). This track number, as shown in FIGURE 3, is the track number of the next instruction, and is designated the "alpha track number." The alpha track number extends from P25 to P20 bit time in the instruction. Therefore, the gate 88(1) is opened at the appropriate time to permit the track selection register to select the track of the next instruction.

Then, the gate 80(1) is opened from P8–P3 bit times of the instruction, which contain the sector number of the next instruction, this being designated "alpha sector number" in FIGURE 3. This number is fed to the coincidence detector 70(1) so that it may be compared with the sector words derived from the $S_{ot}$ channel, as shown in FIGURE 4. These latter words are designated operand sector address ($\beta$) at P13–P9 bit times and instruction section address ($\alpha$) at P8–P3 bit times, as shown in FIGURE 4.

During the search for the next instruction, each subsequent alpha sector number of successive sector words is introduced to the coincidence detector 70(1) until coincidence is derived with the alpha sector number of the instruction word circulating in the instruction register $I_0$(1). When coincidence occurs, the sector of the next instruction has been reached, and the coincidence detector causes the flip-flop (K1) in the control register to be trigered true, so that the unit #1 enters its next phase for an interval corresponding to the following sector on the drum.

The next phase is known as the "instruction read-in" (I*r*) phase. During the instruction read-in phase, the next instruction is read from the selected $M_{oy}$(1) track and sector of the drum through the input terminal 22(1) and through the gate 84(1) into the instruction register $I_0$(1) through the terminal 27(1), the instruction being circulated lock through the terminal 25(1). The instruction also shifts into and through the flip-flops 01, 02 and 03 of the order register 30(1), and at the end of the read-in phase the last three digits P2, P1 and P0 which, as shown in FIGURE 3 designate the order code, are held in theorder register. The new instruction now circulates through the instruction register $I_0$(1), and it continues to circulate until the next read-in phase is established.

The third phase of the computer unit #1 is the "wait for beta" ($W_B$) phase. For this latter phase, the control flip-flops of the control register 32(1) are set, for example, to a K1, K2, K3 configuration. This causes the gate 88(1) to be enabled for P19–P14 bit times of the instruction word circulating in the instruction register $I_0$(1). This portion of the instruction word includes the beta track number which is the track number of the corresponding operand. This number is passed through the gate 88(1) to set the track selection register 36(1) to a configuration corresponding to the track on the memory drum 10 of FIGURE 1 in which the desired operand occurs.

Then, for the P13–P9 bit time of the instruction word, the gate 80 is enabled. These latter bit times include the sector number of the desired operand, designated the "beta sector number" in FIGURE 3. When the desired sector is reached, the coincidence detector 70(1) indicates the coincidence, and the flip-flop K2 of the control register 32(1) is triggered false. This places the unit in the "first word phase" ($F_W$) and the gate 86(1) is enabled. When the gate 86(1) is enabled, the selected operand from the $M_{oy}$(1) channel of the memory drum is fed into the arithmetic section 23(1). The order portion (P2–P0) of the instruction, which is set into order register 30(1) is also fed to the arithmetic section to designate the arithmetic operation to be performed on the operand.

As indicated above, the operation of the general purpose computer unit #2 is generally similar to that of the unit #1 described above.

It will be appreciated, therefore, that each of the general purpose computer units 1 and 2 operates entirely independently of the other. It will also be appreciated that in accordance with the concepts of the invention there are no electrical connections between the units, and that all transfer of information is A through the memory drum 10. Therefore, the malfunction in either one of the computer units 1 and 2 is not reflected in any way into the other unit. Therefore, the desired degree of reliability is achieved, without any likelihood of a malfunction in one of the units also causing a malfunction in the other.

The spacing of the groups of heads 12(1) and 12(2) in the $M_{oy}$ channels is preferably made an integral number of word times, so that the bit times are the same in each of the units. This permits a common bit counter to be used for timing the operations in all the units of the computer system.

Although the selection of the operands and instructions from the common memory drum 10 by the different computer units occurs at different times, due to the displacements of the groups of heads 12(1) and 12(2) in the corresponding channels of the drum; the corresponding displacement of the heads 14(1) and 14(2) in the sector address channel $S_{ot}$ provides the proper timing control for each of the computer units.

Also, the use of separate instruction register channels $I_0$(1) and $I_0$(2) permits the same instructions to be circulated in separate channels of the drum 10 at slightly different times for use by the different general purpose computer units completely independent from one another.

The invention provides, therefore, an improved computer system in which a plurality of individual computer units are utilized for reliability and for other purposes, and in which the different units are completely isolated from one another, so that a malfunction in any of the units cannot be reflected into the other units.

While a particular embodiment of the invention has been shown and described, modifications may be made, and it is intended in the claims to cover such modifications as fall within the spirit and scope of the invention.

What is claimed is:

1. A digital computer system including: a common memory unit having a plurality of multisector information channels thereon for storing binary information representative of instructions and operands, further having an address channel thereon containing information identifying the sectors in each channel, and further having a plurality of instruction register channels thereon; a plurality of groups of read heads coupled to said information channels at different points of access thereto to derive said instructions and operands therefrom; a corresponding plurality of digital computer units connected to respective ones of said groups of read heads; a further plurality of read heads coupled to said address channel at different points of access having mutual displacements corresponding to the displacements of the heads of the aforesaid groups and connected to respective ones of said computer units; a plurality of write heads coupled to respective ones of said instruction register channels and connected to respective ones of said computer units, and a plurality of read heads coupled to respective ones of said instruction register channels at selected displacements with respect to corresponding ones of said write heads and connected to respective ones of said computer units, so that said computer units derive the same instructions from said memory unit in the same predetermined sequence but at selected time displacements and cause the same to circulate in respective ones of said instruction register channels at said selected time displacements, and so that said computer units all select the same operands from said memory unit in the same sequence at said selected time displacement and perform the same arithmetic operations thereon.

2. The digital computer system defined in claim 1 in which said selected time displacements correspond to an integral number of word times of said operands and instructions.

3. The digital computer system defined in claim 1 in which said memory unit includes a rotatable magnetic memory member, and said read and write heads are in the form of electromagnetic transducers.

References Cited by the Examiner

UNITED STATES PATENTS

| | | | |
|---|---|---|---|
| 3,139,521 | 6/1964 | Johnson | 235—92 |
| 3,158,844 | 11/1964 | Bowdle | 340—174.1 |

ROBERT C. BAILEY, *Primary Examiner.*

R. ZACHE, *Assistant Examiner.*